United States Patent
Onodera et al.

(10) Patent No.: US 8,649,731 B2
(45) Date of Patent: Feb. 11, 2014

(54) BASE STATION APPARATUS, RELAY STATION APPARATUS, AND COMMUNICATION SYSTEM

(75) Inventors: Takashi Onodera, Osaka (JP); Toshizo Nogami, Osaka (JP); Osamu Nakamura, Osaka (JP); Hiroshi Nakano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 522 days.

(21) Appl. No.: 12/997,512

(22) PCT Filed: Jun. 18, 2009

(86) PCT No.: PCT/JP2009/061121
§ 371 (c)(1),
(2), (4) Date: Dec. 10, 2010

(87) PCT Pub. No.: WO2009/154256
PCT Pub. Date: Dec. 23, 2009

(65) Prior Publication Data
US 2011/0097994 A1    Apr. 28, 2011

(30) Foreign Application Priority Data
Jun. 19, 2008   (JP) ................................. 2008-159925

(51) Int. Cl.
*H04B 3/36* (2006.01)
(52) U.S. Cl.
USPC ............. 455/7; 455/11.1; 455/13.1; 455/522; 455/450; 455/455; 370/315; 370/316; 370/318; 370/319; 370/320
(58) Field of Classification Search
USPC ................ 455/522, 69–70, 450–455, 7–11.1, 455/13.4; 370/315–320
See application file for complete search history.

(56) References Cited

U.S. PATENT DOCUMENTS

2008/0045141 A1*  2/2008  Suga .................................. 455/7
2009/0190561 A1*  7/2009  Yokoyama .................... 370/335
(Continued)

FOREIGN PATENT DOCUMENTS

EP    1 852 986 A1    11/2007
EP    2 063 552 A1    5/2009
(Continued)

OTHER PUBLICATIONS

Japanese Office Action for corresponding application No. 2008-159925, dated Apr. 10, 2012.
(Continued)

*Primary Examiner* — Fayyaz Alam
(74) *Attorney, Agent, or Firm* — Birch, Stewart, Kolasch & Birch, LLP

(57) ABSTRACT

Provided is a communication system that can allocate resources on an uplink for a CQI report, and can reduce the overhead of the CQI relay transmission from a relay station apparatus to a base station apparatus. To each mobile station apparatus (501, 502) that transmits CQI directly to a base station apparatus (500), resource blocks on a base station apparatus uplink to be used for the transmission of each CQI to the base station apparatus are allocated. Resource blocks on the base station apparatus uplink to be used for each relay station to relay-transmit to the base station apparatus CQI received from the mobile station apparatuses are allocated on the basis of the allocation result of resource blocks on a relay station apparatus uplink for each relay station apparatus (510, 520). To mobile station apparatuses that transmit CQI to the base station apparatus via each relay station apparatus, resource blocks on the relay station apparatus uplink to be used for the transmission of CQI to the relay station apparatus are allocated.

7 Claims, 8 Drawing Sheets

(56) References Cited

U.S. PATENT DOCUMENTS

2010/0069082 A1* 3/2010 Kim et al. ............... 455/452.2
2010/0202306 A1* 8/2010 Jersenius et al. ............ 370/252

FOREIGN PATENT DOCUMENTS

| | | |
|---|---|---|
| JP | 2008-48221 A1 | 2/2008 |
| WO | WO 2006/098273 A1 | 9/2006 |
| WO | WO 2008/050425 A1 | 5/2008 |
| WO | WO 2008/056095 A1 | 5/2008 |
| WO | WO 2008/068803 A1 | 6/2008 |

OTHER PUBLICATIONS

Shashikant Maheshwari, et al., "CQICH Reporting in Centralized Scheduling," IEEE 802.16 Broadband Wireless Access Working Group, pp. 1-5, Jan. 22, 2008.

Hasegawa et al., "Multi-hop System for Adaptive Modulation using Regenerating Fixed Hop Stations", The Institute of Electronics Information and Communication Engineers, Technical Report of IEICE, A-P20074, RCS2004-210(Oct. 2004), pp. 57-61.

\* cited by examiner

BASE STATION APPARATUS, RELAY STATION APPARATUS, AND COMMUNICATION SYSTEM

TECHNICAL FIELD

The present invention relates to a communication system in which a mobile station apparatus measures the reception state from a received signal and provides the measurement result to a base station apparatus directly or via a relay station apparatus, and also relates to the base station apparatus and the relay station apparatus.

BACKGROUND ART

In the next-generation mobile communication, carrier frequency is expected to increase with an expansion of the frequency band used. An increase in the carrier frequency can increase a propagation loss of radio waves, which in turn can reduce the cell size. In order to realize the same degree of coverage as the conventional coverage, it is necessary to increase the number of base station apparatuses. This, however, will increase the cost. Thus, a system in which a relay station apparatus is provided between a base station apparatus and a mobile station apparatus has been considered. As the mobile station apparatus may communicate not with the base station apparatus at a remote location but with the relay station apparatus, it is possible to significantly reduce the transmission power, which is problematic on an uplink, in particular.

Non-Patent Document 1 proposes a system that is suitable for the adaptive modulation techniques using relay station apparatuses. In this system, a mobile station apparatus that has a good propagation channel state with the base station apparatus performs downlink data communication through high-efficiency data modulation such as 64 QAM (Quadrature Amplitude Modulation), while a mobile station apparatus that has a bad propagation channel state with the base station apparatus performs downlink data communication through low-speed data modulation such as QPSK (Quadrature Phase Shift Keying).

Non-Patent Document 1: Ryo Hasegawa, Raiz Esmailzadeh, Hoang Nam Nguyen, and Masao Nakagawa: "Multi-hop System for Adaptive Modulation using Regenerating Fixed Hop Stations," TECHNICAL REPORT OF IEICE, RCS2004-210

DISCLOSURE OF THE INVENTION

Problems to be Solved by the Invention

In order to perform the aforementioned adaptive modulation or scheduling on a downlink, each mobile station apparatus should report information indicating the reception state of a downlink received signal (CQI: Channel Quality Indicator) to the base station apparatus using an uplink. In the case of a mobile station apparatus that performs communication via a relay station apparatus on an uplink, each mobile station apparatus should report CQI to the relay station apparatus, and further, the relay station apparatus should relay-transmit the CQI to the base station apparatus. Thus, a problem would arise that the overhead of the uplink, which is necessary for a CQI report, could increase. Further, it is also necessary to determine allocation of resources on the uplink to be used for each mobile station apparatus to transmit the CQI to the base station apparatus or to the relay station apparatus as well as allocation of resources on the uplink to be used for the relay station apparatus to transmit the CQI to the base station apparatus.

The present invention has been made in view of the foregoing circumstances, and provides a base station apparatus for use in a communication system that includes a base station apparatus and mobile station apparatuses configured to perform radio communication via a plurality of channels, and also includes relay station apparatuses configured to relay the communication between the base station apparatus and the mobile station apparatuses, the base station apparatus being capable of allocating resources on an uplink for a CQI report and reducing the overhead of the CQI relay transmission from the relay station apparatus to the base station apparatus.

The present invention also provides a relay station apparatus and a communication system.

Means for Solving the Problems

A base station apparatus in accordance with the present invention includes a relay station allocation unit configured to determine a relay station allocation that is a channel allocation of first radio resources to be used for each relay station apparatus to relay-transmit to the base station apparatus reception state information indicating a channel reception state transmitted from each mobile station apparatus that communicates with the base station apparatus via the relay station apparatus; a mobile station allocation unit configured to determine a mobile station allocation that is a channel allocation of second radio resources to be used for each mobile station apparatus to transmit the reception state information to the relay station apparatus on the basis of a result of the relay station allocation; and a radio transmission unit configured to transmit information to each mobile station apparatus and each relay station apparatus, the information including mobile station allocation information that indicates a result of the mobile station allocation, and relay station allocation information that indicates a result of the relay station allocation.

A relay station apparatus in accordance with the present invention includes a first radio reception unit configured to receive information transmitted from the base station apparatus, the information including mobile station allocation information and relay station allocation information, the mobile station allocation information indicating a channel allocation of second radio resources to be used for each mobile station apparatus, which communicates with the base station apparatus via the relay station apparatus, to transmit to the relay station apparatus reception state information indicating a channel reception state, and the relay station allocation information indicating a channel allocation of first radio resources to be used for the relay station apparatus to relay-transmit to the base station apparatus the reception state information transmitted from each mobile station apparatus; an allocation information storage unit adapted to have stored therein the mobile station allocation information and the relay station allocation information that have been received; a second radio reception unit configured to receive, on the basis of the mobile station allocation information stored in the allocation information storage unit, the reception state information transmitted from each mobile station apparatus that communicates with the base station apparatus via the relay station apparatus among the mobile station apparatuses; and a radio transmission unit configured to transmit, on the basis of the relay station allocation information stored in the allocation information storage unit, each of the received reception state information to the base station apparatus.

According to a communication system of the present invention, the base station apparatus performs the following processes: determining a relay station allocation that is a channel allocation of first radio resources to be used for each relay station apparatus to relay-transmit to the base station apparatus reception state information indicating a channel reception state transmitted from each mobile station apparatus that communicates with the base station apparatus via the relay station apparatus, and determining a mobile station allocation that is a channel allocation of second radio resources to be used for each mobile station apparatus to transmit the reception state information to the relay station apparatus on the basis of a result of the relay station allocation.

Advantages of the Invention

According to the present invention, it is possible to, in a communication system that includes a base station apparatus and mobile station apparatuses configured to perform radio communication via a plurality of channels, and also includes relay station apparatuses configured to relay the communication between the base station apparatus and the mobile station apparatuses, allocate resources on an uplink for a CQI report and to reduce the overhead of the CQI relay transmission from the relay station apparatus to the base station apparatus.

Figure 1:
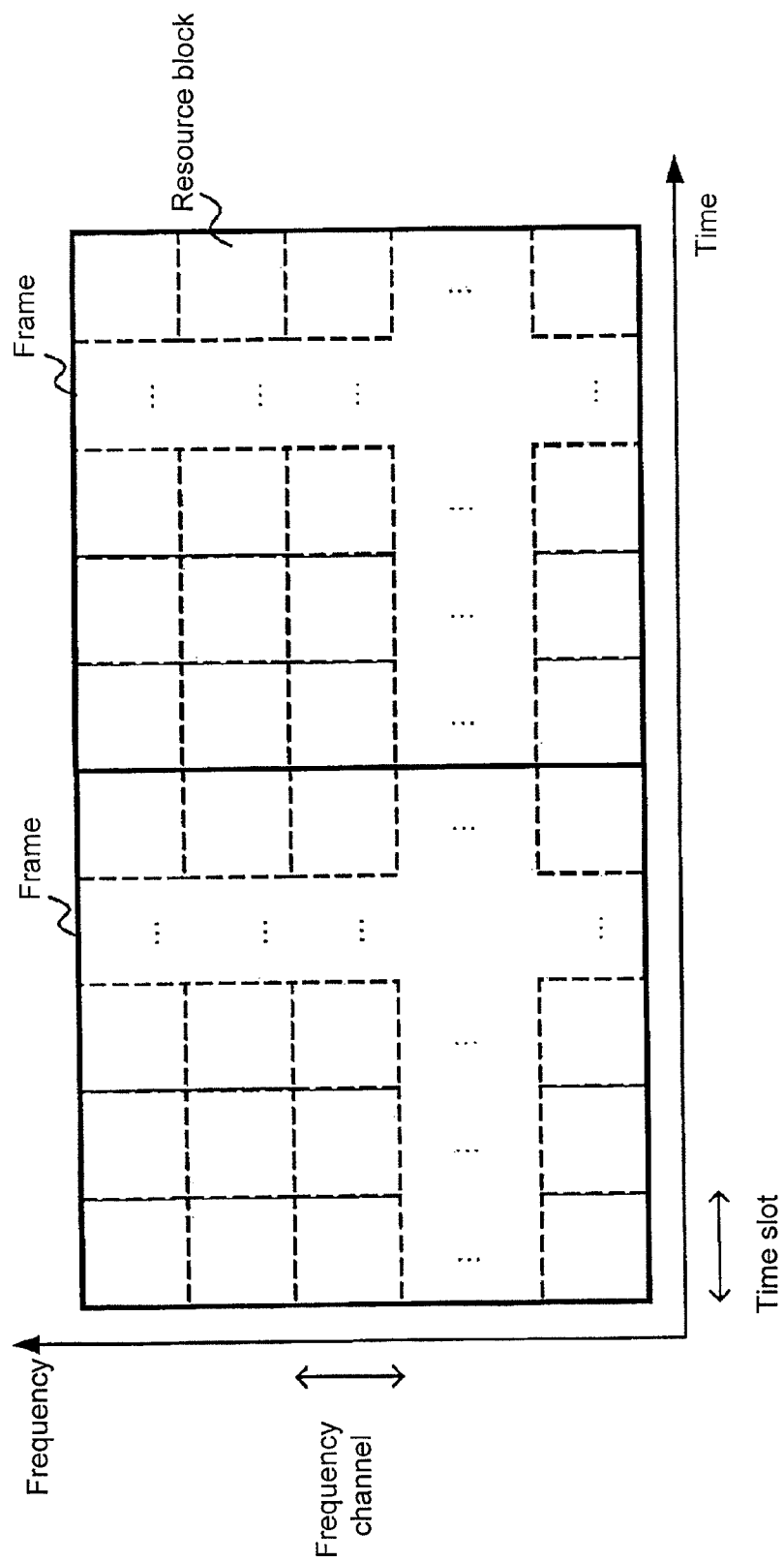
FIG. 1 is a diagram showing exemplary downlink and uplink frame structures.

DESCRIPTION OF SYMBOLS 200 base station apparatus
201 mobile station allocation unit
202 relay station allocation unit
203 coding unit
204 modulation unit
205 pilot generation unit
206 multiplexer
207 radio transmission unit
208 antenna unit
209 radio reception unit
210 separator
211 propagation channel estimation unit
212 propagation channel correction unit
213 demodulation unit
214 decoding unit
215 allocation information storage unit
216 CQI storage unit
217 scheduling unit
300 relay station apparatus
301 antenna unit
302 radio reception unit
303 separator
304 propagation channel estimation unit
305 propagation channel correction unit
306 demodulation unit
307 decoding unit
308 allocation information storage unit
309 antenna unit
310 radio reception unit
311 separator
312 propagation channel estimation unit
313 propagation channel correction unit
314 demodulation unit
315 decoding unit
316 reconstruction unit
317 coding unit
318 modulation unit
319 pilot generation unit
320 multiplexer
321 radio transmission unit
400 mobile station apparatus
401 antenna unit
402 radio reception unit
403 separator
404 propagation channel estimation unit
405 propagation channel correction unit
406 demodulation unit
407 decoding unit
408 allocation information storage unit
409 CQI generation unit
410 coding unit
411 modulation unit
412 pilot generation unit
413 multiplexer
414 radio transmission unit

BEST MODES FOR CARRYING OUT THE INVENTION

Hereinafter, an embodiment in which the present invention is applied to a cellular system that performs communication using a plurality of frequency channels will be described.

It should be noted that each of the following embodiments will be described on the assumption that each mobile station apparatus, when measuring the reception state of a downlink received signal (a propagation channel state) and reporting the reception state information (CQI: Channel Quality Indicator) indicative of the measurement result to the base station apparatus, uses as the CQI an index calculated on the basis of a pilot signal such as a CNR (Carrier to Noise power Ratio).

FIG. 1 is a diagram showing exemplary downlink and uplink frame structures in the description of each of the following embodiments. As shown in FIG. 1, a frame in this embodiment includes a plurality of resource blocks divided on the basis of a plurality of frequency channels in the frequency direction and a plurality of time slots in the time direction.

A base station apparatus (BS) determines allocation of each resource block, which is used for the communication with a mobile station apparatus (MS) or a relay station apparatus (RS), for each frame, and reports it as the downlink control information to the mobile station apparatus and the relay station apparatus.

It should be noted that the applicable range of the present invention is not limited to the frame structures shown in FIG. 1, and the present invention can be applied to any system that performs communication using a plurality of channels (resource blocks), which are divided on the basis of the frequency, time, code, antenna, or the like, and that has a possibility that the reception state of each channel may differ depending on mobile station apparatuses.

Further, each of the following embodiments will describe a system in which a base station apparatus communicates directly with mobile station apparatuses on a downlink, while on an uplink, whether to communicate directly with the base station apparatus or via a relay station apparatus is selected according to the reception state of each mobile station apparatus.

[First Embodiment]

Hereinafter, the first embodiment of the present invention will be described with reference to the drawings.

Figure 2:
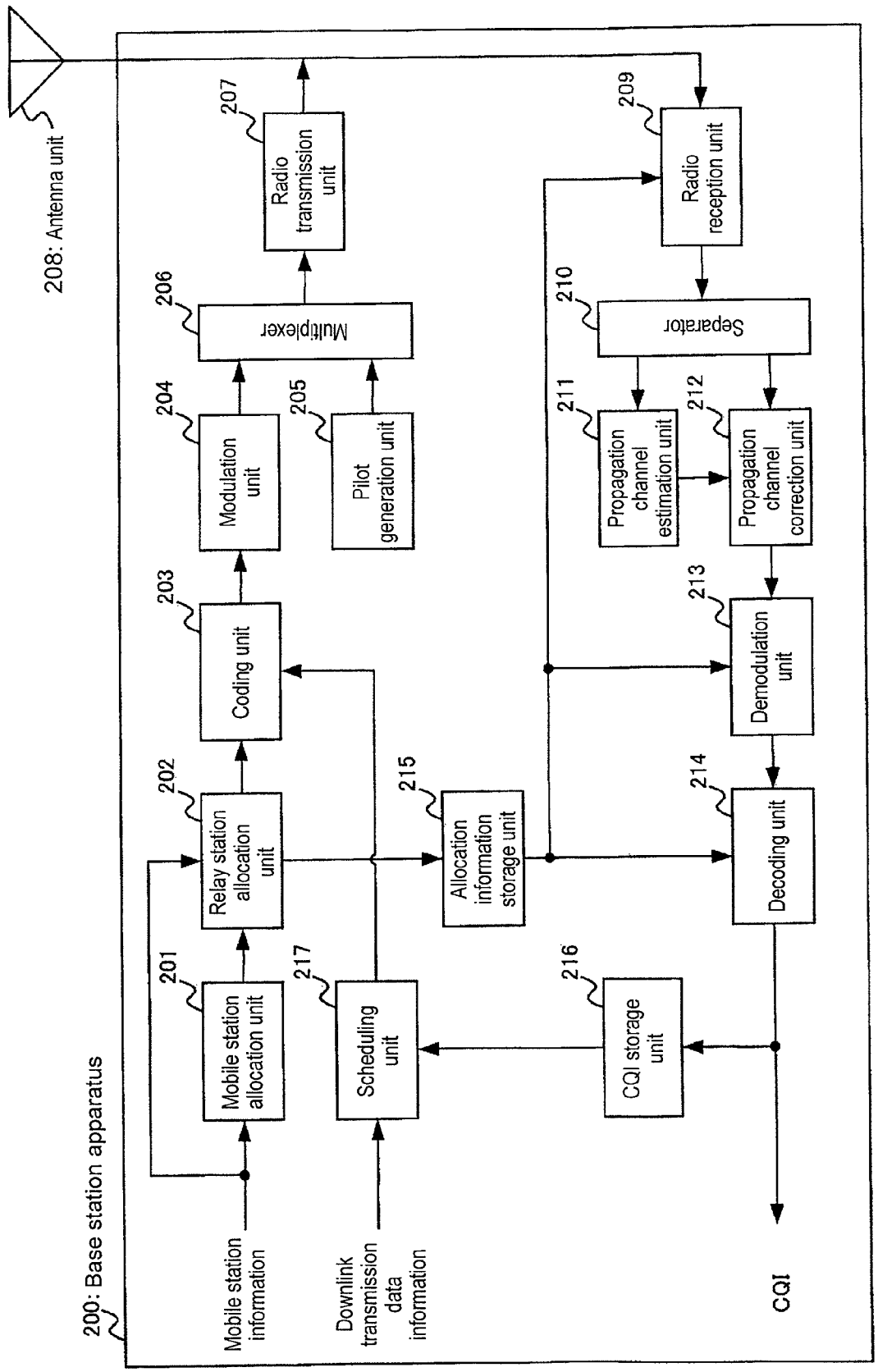
FIG. 2 is a schematic block diagram showing the configuration of a base station apparatus of the present invention.

FIG. 2 is a schematic block diagram showing the configuration of a base station apparatus 200 in this embodiment. The base station apparatus 200 includes a mobile station allocation unit 201, a relay station allocation unit 202, a coding unit 203, a modulation unit 204, a pilot generation unit 205, a multiplexer 206, a radio transmission unit 207, an antenna unit 208, a radio reception unit 209, a separator 210, a propagation channel estimation unit 211, a propagation channel correction unit 212, a demodulation unit 213, a decoding unit 214, an allocation information storage unit 215, a CQI storage unit 216, and a scheduling unit 217.

Figure 3:
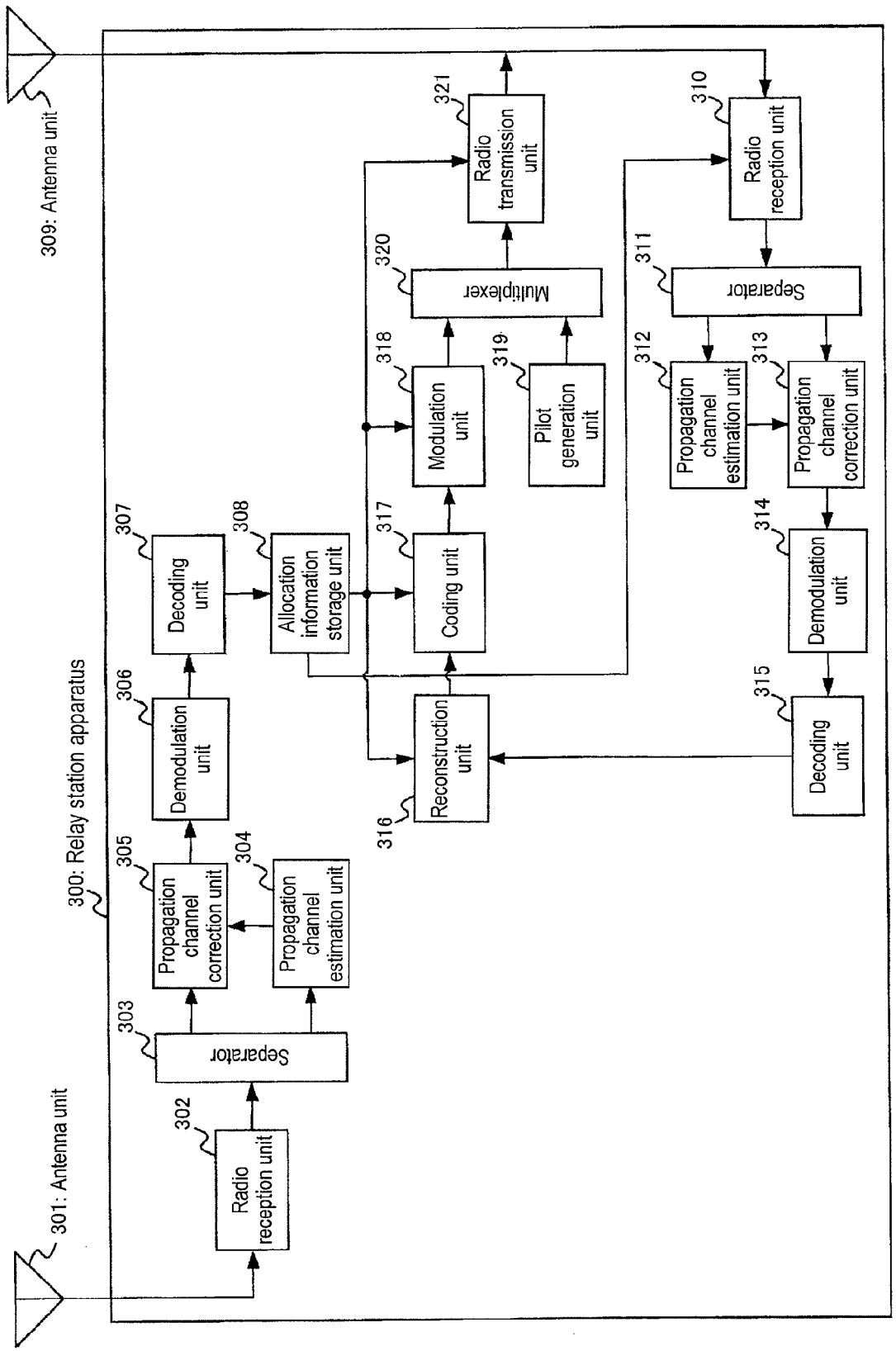
FIG. 3 is a schematic block diagram showing the configuration of a relay station apparatus of the present invention.

FIG. 3 is a schematic block diagram showing the configuration of a relay station apparatus 300 in this embodiment. The relay station apparatus 300 includes an antenna unit 301, a radio reception unit 302, a separator 303, a propagation channel estimation unit 304, a propagation channel correction unit 305, a demodulation unit 306, a decoding unit 307, an allocation information storage unit 308, an antenna unit 309, a radio reception unit 310, a separator 311, a propagation channel estimation unit 312, a propagation channel correction unit 313, a demodulation unit 314, a decoding unit 315, a reconstruction unit 316, a coding unit 317, a modulation unit 318, a pilot generation unit 319, a multiplexer 320, and a radio transmission unit 321.

Figure 4:
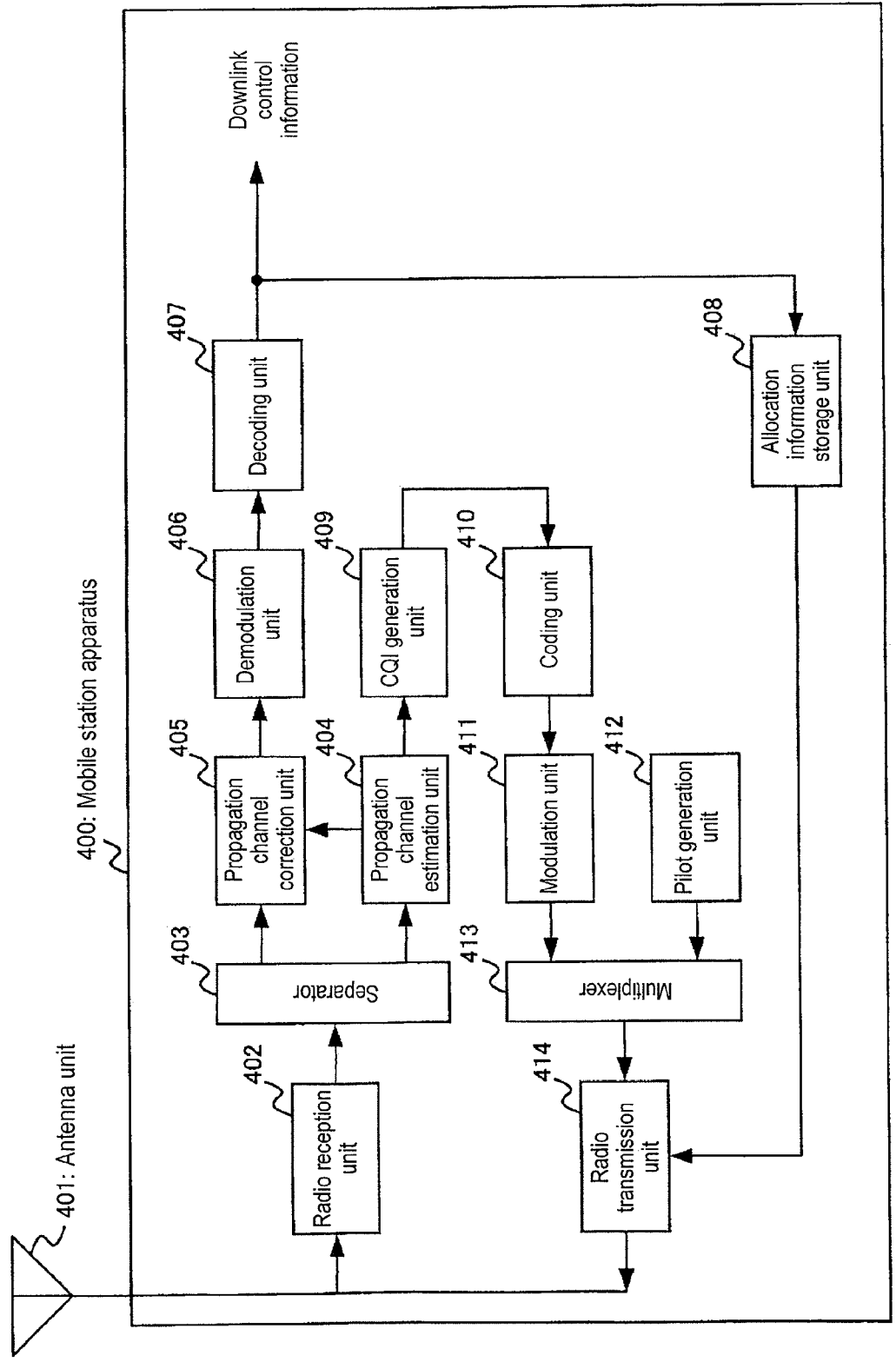
FIG. 4 is a schematic block diagram showing the configuration of a mobile station apparatus of the present invention.

FIG. 4 is a schematic block diagram showing the configuration of a mobile station apparatus 400 in this embodiment. The mobile station apparatus 400 includes an antenna unit 401, a radio reception unit 402, a separator 403, a propagation channel estimation unit 404, a propagation channel correction unit 405, a demodulation unit 406, a decoding unit 407, an allocation information storage unit 408, a CQI generation unit 409, a coding unit 410, a modulation unit 411, a pilot generation unit 412, a multiplexer 413, and a radio transmission unit 414.

First, procedures from when the base station apparatus 200 transmits a downlink control signal till the mobile station apparatus 400 receives the downlink control signal will be described with reference to FIGS. 2, 3, and 4.

The operation of the base station apparatus 200 on a downlink will be described with reference to FIG. 2.

The relay station allocation unit 202 receives mobile station information that includes information indicating whether each mobile station apparatus that is communicating in a cell should, in reporting CQI to the base station apparatus on an uplink, communicate directly with the base station apparatus or via a relay station apparatus, and in the latter case, also includes information about which relay station apparatus should relay the communication. Then, the relay station allocation unit 202 determines (schedules) allocation of resource blocks on the uplink to be used for each relay station apparatus to relay-transmit the CQI from the mobile station apparatus to the base station apparatus, and then outputs the allocation result (hereinafter, information indicating this result will be referred to as "relay station allocation information"). The detailed operation of the relay station allocation will be described later.

The mobile station allocation unit 201 determines (schedules), on the basis of the aforementioned mobile station information and the relay station allocation result of the relay station allocation unit 202, allocation of resource blocks on the uplink to be used for each mobile station apparatus to transmit the CQI and the type of the CQI, and then outputs the allocation result (hereinafter, information indicating this result will be referred to as "mobile station allocation information"), together with the relay station allocation result. The detailed operation of the mobile station allocation will be described later.

The allocation information storage unit 215 stores the mobile station allocation information and the relay station allocation information.

The scheduling unit 217 determines, on the basis of the downlink transmission data information about the data transmitted on a downlink such as the data amount, data rate, and QoS (Quality Of Service) as well as the CQI reported from each mobile station apparatus and stored in the CQI storage unit, which is described layer, allocation (scheduling) of transmission data, which is addressed to each mobile station apparatus, to resource blocks on the downlink, and also determines a modulation scheme, an error-correcting coding scheme, a code rate (adaptive modulation parameter), and the like.

The coding unit 203 receives the mobile station allocation information and the relay station allocation information and also receives the downlink scheduling result, the adaptive modulation parameter, and the like output from the scheduling unit 217 to generate downlink control information. Then, the coding unit 203 applies error-correcting coding to the downlink control information and outputs it.

The modulation unit 204 modulates the downlink control information that has been subjected to the error-correcting coding in the coding unit 203, and outputs a modulated symbol.

The pilot generation unit 205 generates a pilot symbol for performing propagation channel estimation and propagation channel correction in reception, and outputs it.

The multiplexer 206 multiplexes the pilot symbol output from the pilot generation unit 205 with the modulated symbol output from the modulation unit 204, and outputs it. The pilot symbol is preferably multiplexed using frequency multiplexing, time multiplexing, code multiplexing, or a combination of them.

The radio transmission unit 207 generates a downlink control signal by digital-analog converting the output of the multiplexer 206 and upconverting it to a radio frequency, and then transmits the signal from the antenna unit 208.

The operation of the relay station apparatus 300 on a downlink will be described with reference to FIG. 3.

The radio reception unit 302 (a first radio reception unit) receives the downlink control signal transmitted from the base station apparatus via the antenna unit 301, downconverts the signal to a baseband signal, analog-digital converts it, and outputs a received symbol.

The separator 303 separates the received symbol output from the radio reception unit 302 into the pilot symbol and the modulated symbol, and outputs each symbol.

The propagation channel estimation unit 304 estimates, on the basis of the pilot symbol output from the separator 303, a propagation channel between the base station apparatus and the relay station apparatus, and outputs an estimated result of the propagation channel.

The propagation channel correction unit 305 performs, on the basis of the estimated result of the propagation channel output from the propagation channel estimation unit 304, a propagation channel correction process to the modulated symbol output from the separator 303, and outputs it.

The demodulation unit 306 demodulates the modulated symbol that has been subjected to the propagation channel correction in the propagation channel correction unit 305, and outputs it.

The decoding unit 307 applies error-correcting decoding to the demodulation result of the demodulation unit 306, and outputs the downlink control information.

The allocation information storage unit 308 extracts from the downlink control information output from the decoding unit 307 the mobile station allocation information and the relay station allocation information and stores them. The allocation information storage unit 308 also determines from such information the target mobile station apparatus to be relayed by the relay station apparatus, and stores it as the relay target information.

The operation of the mobile station apparatus 400 on a downlink will be described with reference to FIG. 4.

The radio reception unit 402 receives the downlink control signal transmitted from the base station apparatus 200 via the antenna unit 401, downconverts the signal to a baseband signal, analog-digital converts it, and outputs a received symbol.

The separator 403 separates the received symbol output from the radio reception unit 402 into the pilot symbol and the modulated symbol, and outputs each symbol.

The propagation channel estimation unit 404 estimates, on the basis of the pilot symbol output from the separator 403, a propagation channel between the base station apparatus and the mobile station apparatus, and outputs an estimated result of the propagation channel. The propagation channel estimation unit 404 also measures a CNR as the reception state, and outputs it.

The propagation channel correction unit 405 performs, on the basis of the estimated result of the propagation channel output from the propagation channel estimation unit 404, a propagation channel correction process to the modulated symbol output from the separator 403, and outputs it.

The demodulation unit 406 demodulates the modulated symbol that has been subjected to the propagation channel correction in the propagation channel correction unit 405, and outputs it.

The decoding unit 407 applies error-correcting decoding to the demodulation result of the demodulation unit 406, and outputs the downlink control information.

The allocation information storage unit 408 extracts the mobile station allocation information from the downlink control information output from the decoding unit 407, and stores it.

Next, procedures from when the mobile station apparatus 400 transmits CQI via an uplink, and the relay station apparatus 300 further relays the CQI till the base station apparatus 200 receives the CQI will be described with reference to FIGS. 2, 3, and 4.

The operation of the mobile station apparatus 400 on an uplink will be described with reference to FIG. 4.

The CQI generation unit 409 generates, on the basis of the CNR, which indicates the downlink reception state, output from the propagation channel estimation unit 404 and the information about the CQI of the mobile station apparatus indicated by the mobile station allocation information stored in the allocation information storage unit 408, CQI to be reported to the base station apparatus.

The coding unit 410 applies error-correcting coding to the CQI output from the CQI generation unit 409.

The modulation unit 411 modulates the CQI that has been subjected to the error-correcting coding in the coding unit 410, and outputs a modulated symbol.

The pilot generation unit 412 generates a pilot symbol for performing propagation channel correction in reception, and outputs it.

The multiplexer 413 multiplexes the pilot symbol output from the pilot generation unit 412 with the modulated symbol output from the modulation unit 411. The pilot symbol is preferably multiplexed using frequency multiplexing, time multiplexing, code multiplexing, or a combination of them.

The radio transmission unit 414, in the resource blocks allocated for the mobile station apparatus to transmit the CQI, which are indicated by the mobile station allocation information stored in the allocation information storage unit 408, digital-analog converts the output of the multiplexer 413, upconverts it to a radio frequency, and transmits it from the antenna unit 401.

The operation of the relay station apparatus 300 on an uplink will be described with reference to FIG. 3.

The radio reception unit 310 (a second radio reception unit) receives the CQI transmitted from each mobile station apparatus via the antenna unit 309, downconverts the signal to a baseband signal, and analog-digital converts it. Then, the radio reception unit 310 identifies, from the relay target information and the mobile station allocation information stored in the allocation information storage unit 308, the resource blocks to which the CQI transmitted from the target mobile station apparatus, which is to be relayed by the relay station apparatus, is allocated, and outputs a received symbol about such resource blocks.

The separator unit 311 separates, for each mobile station apparatus, the received symbol output from the radio reception unit 310 into the pilot symbol and the modulated symbol, and outputs each symbol.

The propagation channel estimation unit 312 estimates, on the basis of the pilot symbol output from the separator 311, a propagation channel between one or more mobile station apparatuses and the relay station apparatus, and outputs an estimated result of each propagation channel.

The propagation channel correction unit 313 performs, on the basis of the estimated result of the propagation channel between each mobile station apparatus and the relay station apparatus output from the propagation channel estimation unit 312, a propagation channel correction process to the modulated symbol of each mobile station apparatus output from the separator 312.

The demodulation unit 314 demodulates the modulated symbol that has been subjected to the propagation channel correction in the propagation channel correction unit 313, and outputs it.

The decoding unit 315 applies error-correcting decoding to the demodulation result of the demodulation unit 314 for each mobile station apparatus, and outputs the CQI of each mobile station apparatus.

The reconstruction unit 316 performs, on the basis of the mobile station allocation information and the relay station allocation information stored in the allocation information storage unit 308, one or more of the following processes: coupling, compression, selective use/disuse, and the like to the CQI of each mobile station apparatus to reconstruct the CQI, and outputs it. The details of the CQI reconstruction will be described later.

Similarly, the coding unit 317 applies error-correcting coding to the reconstructed CQI output from the reconstruction unit 316 using an error-correcting coding scheme and a code rate that are based on the relay station allocation information.

Likewise, the modulation unit 318 modulates the reconstructed CQI, which has been subjected to the error-correcting coding, output from the coding unit 317 using a modulation scheme that is based on the relay station allocation information, and outputs a modulated symbol.

The pilot generation unit 319 generates a pilot symbol for performing propagation channel correction in reception, and outputs it.

The multiplexer 320 multiplexes the pilot symbol output from the pilot generation unit 319 with the modulated symbol output from the modulation unit 318. The pilot symbol is preferably multiplexed using frequency multiplexing, time multiplexing, code multiplexing, or a combination of them.

The radio transmission unit 321, in the resource blocks allocated for the relay station apparatus to relay-transmit the CQI, which are indicated by the relay station apparatus allocation information stored in the allocation information storage unit 308, digital-analog converts the output of the multiplexer 320, upconverts it to a radio frequency, and transmits it from the antenna unit 309.

The operation of the base station apparatus 200 on an uplink will be described with reference to FIG. 2.

The radio reception unit 209 receives, on the basis of the mobile station allocation information and the relay station allocation information stored in the allocation information storage unit 215, the CQI that has been transmitted from each mobile station apparatus that communicates directly with the base station apparatus, and the CQI that has been relay-transmitted from each relay station apparatus, via the antenna unit 208, downconverts the signal to a baseband signal, analog-digital converts it, and outputs a received symbol.

The separator 210 separates the received symbol output from the radio reception unit 209 into the pilot symbol and the modulated symbol, and outputs each symbol.

The propagation channel estimation unit 211 estimates, on the basis of the pilot symbol output from the separator 210, a propagation channel between the base station apparatus and each relay station apparatus as well as a propagation channel between the base station apparatus and each mobile station apparatus, and outputs an estimated result of each propagation channel.

The propagation channel correction unit 212 performs, on the basis of the estimated result of the propagation channel output from the propagation channel estimation unit 211, a propagation channel correction process to the modulated symbol output from the separator 201, and outputs it.

The demodulation unit 213 demodulates, on the basis of the mobile station allocation information and the relay station allocation information stored in the allocation information storage unit 215, the modulated symbol that has been subjected to the propagation channel correction in the propagation channel correction unit 212, and outputs it.

The decoding unit 214 applies, on the basis of the mobile station allocation information and the relay station allocation information stored in the allocation information storage unit 215, error-correcting decoding to the demodulation result of the demodulation unit 213 for each mobile station apparatus, and outputs the CQI of each mobile station apparatus. With regard to the CQI related to a mobile station apparatus that has been reported via a relay station apparatus, the CQI that has been reconstructed in the relay station apparatus 300 is separated/restored to the CQI of each mobile station apparatus.

The CQI storage unit 216 stores the CQI of each mobile station apparatus output from the decoding unit 214.

It should be noted that in the aforementioned configuration examples of the base station apparatus 200, the relay station apparatus 300, and the mobile station apparatus 400, only the communication of control information on a downlink and the communication of CQI on an uplink are described. Besides, downlink data communication, uplink data communication, and communication of control information other than the CQI are performed.

Next, communication related to the CQI between the base station apparatus, the relay station apparatus, and the mobile station apparatus will be described with reference to FIGS. 5 and 6. Each configuration is the same as that described above with regard to each of the base station apparatus 200, the relay station apparatus 300, and the mobile station apparatus 400.

Figure 5:
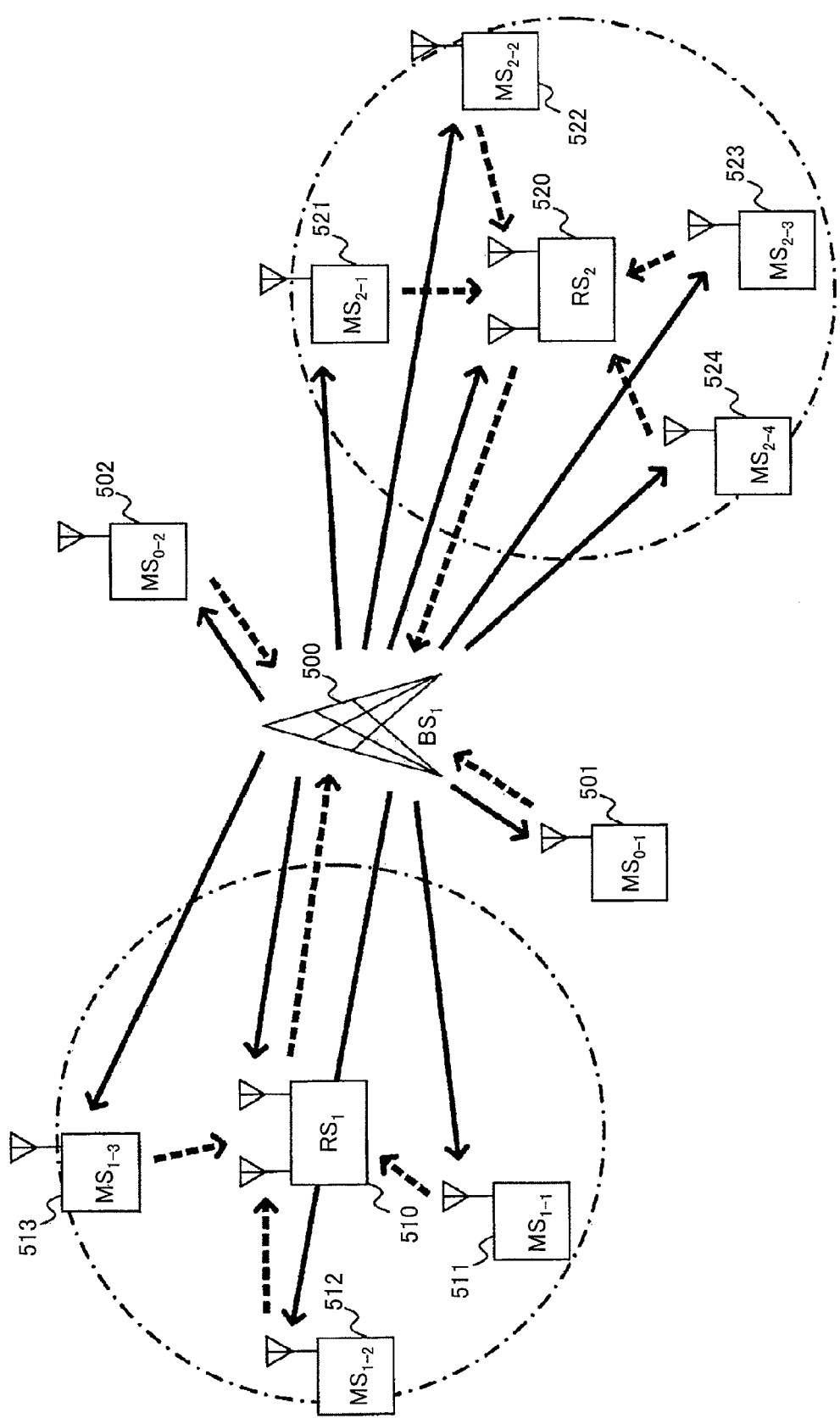
FIG. 5 is a schematic illustration diagram showing an exemplary cell topology.

FIG. 5 is a schematic illustration diagram showing an exemplary cell topology that includes a single base station apparatus 500 ($BS_1$) and also includes thereunder two relay station apparatuses 510 and 520 ($RS_1$ and $RS_2$) and a number of mobile station apparatuses 501, 502, 511, 512, 513, 521, 522, 523, and 524 ($MS_{0-1}$, $MS_{0-2}$, $MS_{1-1}$, $MS_{1-2}$, $MS_{1-3}$, $MS_{2-1}$, $MS_{2-2}$, $MS_{2-3}$, and $MS_{2-4}$). In FIG. 5, downlink communication is indicated by solid arrows, and uplink communication is indicated by dotted arrows. This embodiment will describe a case in which the base station apparatus communicates directly with all of the mobile station apparatuses on a downlink, while on an uplink, the mobile station apparatuses communicate with the base station apparatus via the relay station apparatus as needed.

The $MS_{0-1}$ and the $MS_{0-2}$ are located near the $BS_1$ (have a good propagation channel state). Thus, the $MS_{0-1}$ and the $MS_{0-2}$ communicate directly with the $BS_1$ even on an uplink.

Meanwhile, as the other mobile station apparatuses $MS_{1-1}$, $MS_{1-2}$, $MS_{1-3}$, $MS_{2-1}$, $MS_{2-2}$, $MS_{2-3}$, and $MS_{2-4}$ are located away from the $BS_1$ (have a bad propagation channel state), such mobile station apparatuses transmit signals to the nearby relay station apparatus $RS_1$ or $RS_2$ on an uplink, and each relay station apparatus relay-transmits the signal to the $BS_1$.

Figure 6:
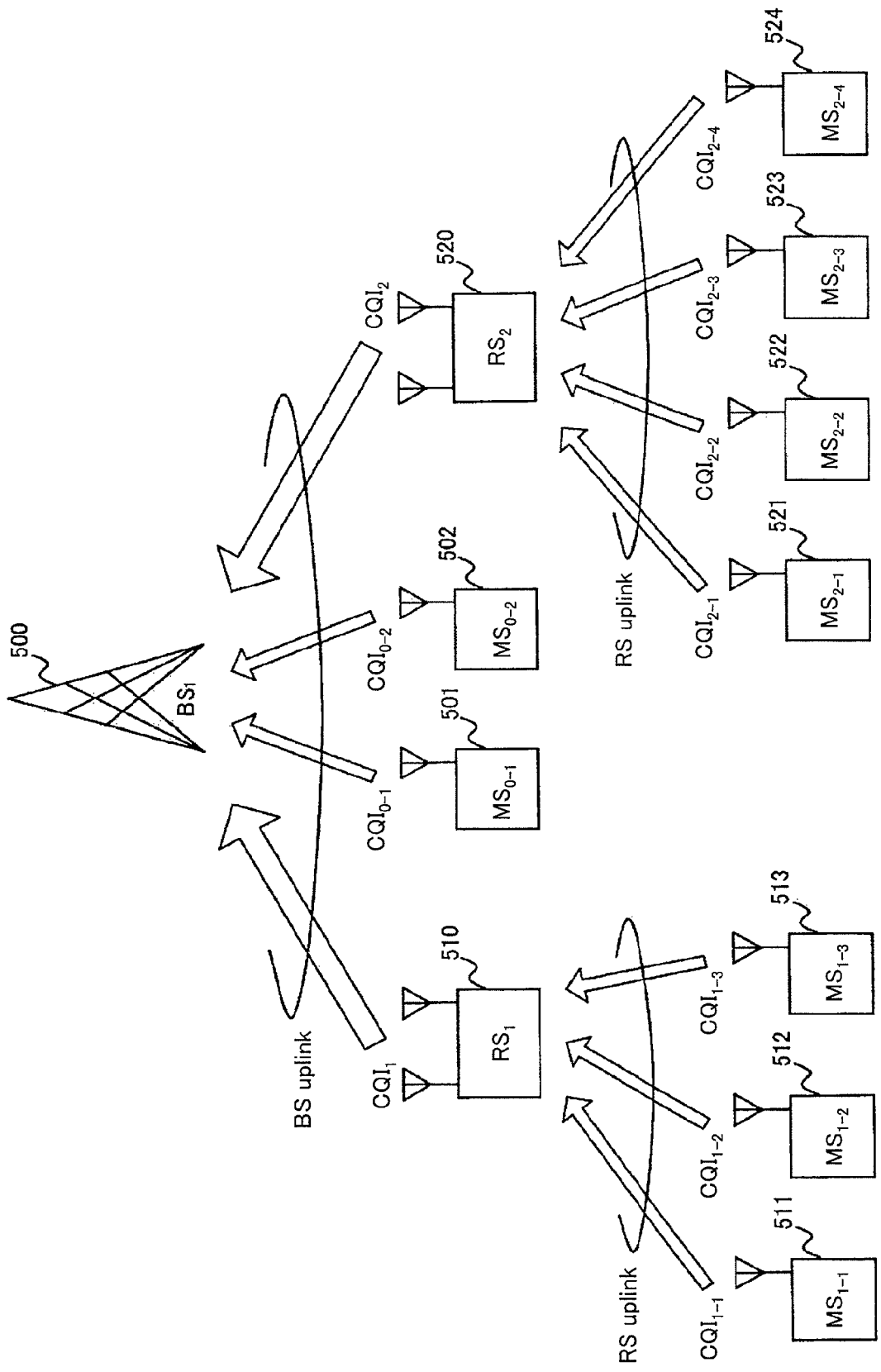
FIG. 6 is a conceptual diagram of a CQI report on an uplink.

FIG. 6 shows a conceptual diagram of a CQI report on an uplink. Reference numbers assigned to the base station apparatus, relay station apparatuses, and mobile station apparatuses are the same as those in FIG. 5. Herein, an uplink on which the mobile station apparatuses and the relay station apparatuses communicate (directly) with the base station apparatus is referred to as a BS uplink, while an uplink on which the mobile station apparatuses communicate with the relay station apparatus is referred to as an RS uplink.

The $MS_{0-1}$ and $MS_{0-2}$, which communicate directly with the $BS_1$, report their respective CQI ($CQI_{0-1}$ and $CQI_{0-2}$) to the $BS_1$ via the BS uplink.

The $MS_{1-1}$, $MS_{1-2}$, and $MS_{1-3}$, which report CQI via the $RS_1$, report their respective CQI ($CQI_{1-1}$, $CQI_{1-2}$, and $CQI_{1-3}$) to the $RS_1$ via the RS uplink. Thereafter, the $RS_1$ relay-transmits $CQI_1$, which is a combination of the $CQI_{1-1}$, $CQI_{1-2}$, and $CQI_{1-3}$, to the $BS_1$ via the BS uplink.

The $MS_{2-1}$, $MS_{2-2}$, $MS_{2-3}$, and $MS_{2-4}$, which report CQI via the $RS_2$, report their respective CQI ($CQI_{2-1}$, $CQI_{2-2}$, $CQI_{2-3}$, and $CQI_{2-4}$) to the $RS_2$ via the RS uplink. After that, the $RS_2$ relay-transmits $CQI_2$, which is a combination of the $CQI_{2-1}$, $CQI_{2-2}$, $CQI_{2-3}$, and $CQI_{2-4}$, to the $BS_1$ via the BS uplink.

Figure 7:
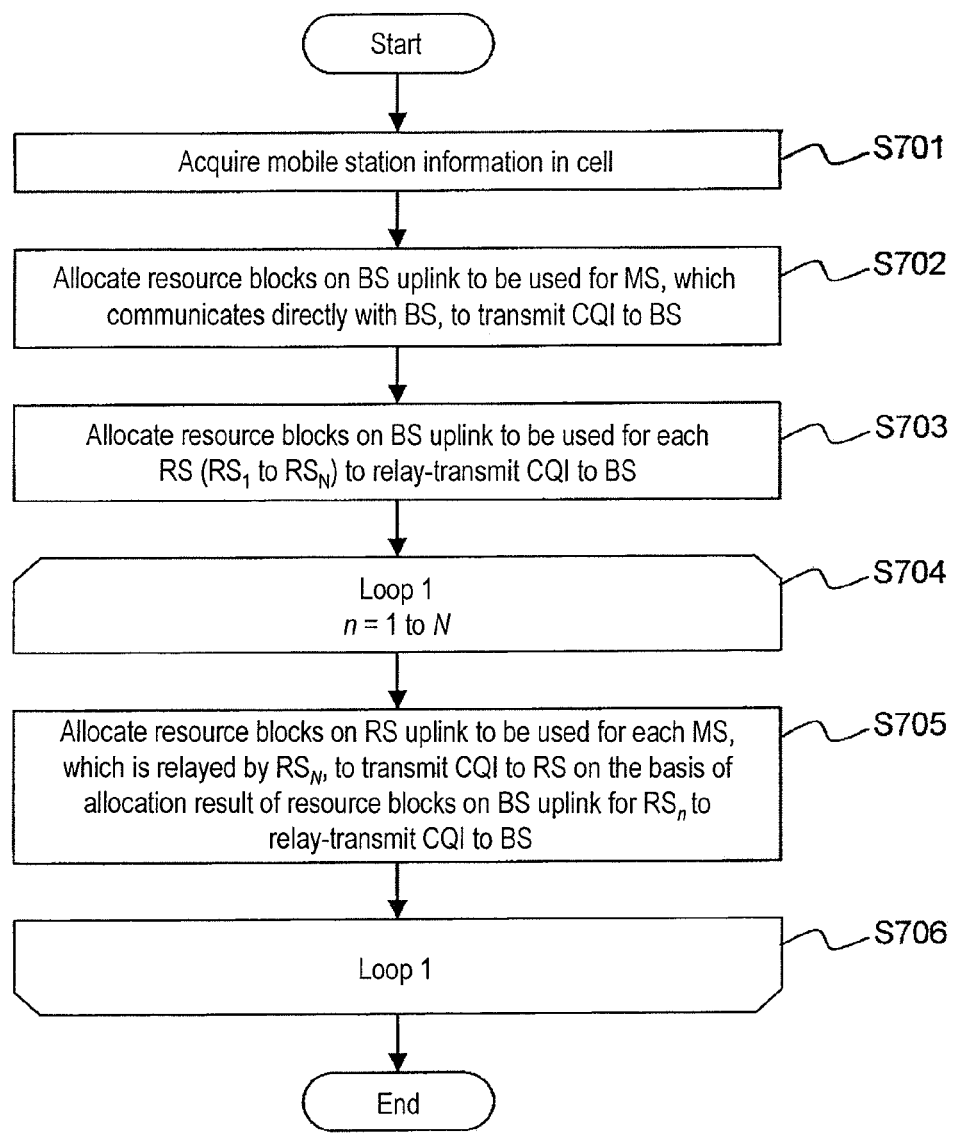
FIG. 7 is a flowchart showing the procedures for allocating, with the base station apparatus, resource blocks on an uplink to be used for the CQI transmission.

FIG. 7 is a flowchart showing the procedures for allocating, with the base station apparatus, resource blocks on an uplink to be used for the CQI transmission. The procedures for allocating resource blocks on an uplink to be used for the CQI transmission will be described with reference to FIG. 7.

In step 701, for a mobile station apparatus that resides in a cell covered by the base station apparatus and is under the control of the base station apparatus, the following information is acquired: information indicating whether the mobile station apparatus should communicate with the base station apparatus directly or via a relay station apparatus, and in the latter case, information about which relay station should relay the communication.

In step S702, to a mobile station apparatus that transmits CQI directly to the base station apparatus, resource blocks on the BS uplink (third radio resources) to be used for the transmission of each CQI to the base station apparatus are allocated.

In step S703, resource blocks on the BS uplink (first radio resources) to be used for each relay station apparatus ($RS_1$ to $RS_N$) to relay-transmit the CQI received from the mobile station apparatus to the base station apparatus are allocated. At this time, a modulation scheme, a code rate, and the like that are used for the relay transmission of CQI are determined for each relay station apparatus. Further, it is also possible to determine whether to use a multi-antenna transmission scheme such as MIMO and the number of streams. For example, to a relay station apparatus that relays the CQI of a number of mobile station apparatuses, resource blocks on the BS uplink that have a good propagation channel state with the base station apparatus are allocated, and a high modulation scheme and code rate, or a large number of MIMO streams are determined to be used.

In a loop from steps S704 to S706, to a mobile station apparatus that transmits CQI to the base station apparatus via each relay station apparatus ($RS_1$ to $RS_N$), resource blocks on the RS uplink (second radio resources) to be used for each mobile station apparatus to transmit its CQI to the relay station apparatus are allocated on the basis of the allocation result of the resource blocks on the BS uplink for the relay-transmission of QCI from each relay station apparatus to the base station apparatus. At this time, the resource blocks on the RS uplink are preferably allocated so that the number of mobile station apparatuses (which include even mobile station apparatuses that transmit CQI via different relay station apparatuses) to which the same resource block on the RS uplink are allocated is minimum.

The location and the number (size) of the resource blocks on the RS uplink to be allocated to each mobile station apparatus, the number of frequency channels that are reported with the CQI (the number of frequency channels to be reported in a method such as a Best-M scheme that reports some of frequency channels with a good propagation channel state), a compression ratio of the information to be reported with the CQI (the number of samples to be reported in a method that applies DCT with the CNR of a frequency channel as each sampled value and reporting some of the samples from among the obtained results), and the number of bits that represent the CQI (the quantization bit rate for representing the CNR or the number of bits in a difference value in a method that represents the CNR using the difference value between the frequency channels or between the time slots) are determined in accordance with the number (size) of the resource blocks on the BS uplink allocated to each relay station apparatus, the propagation channel state between the relay station apparatus and the base station apparatus on the resource blocks, and the number of mobile station apparatuses to be relayed.

Figure 8:
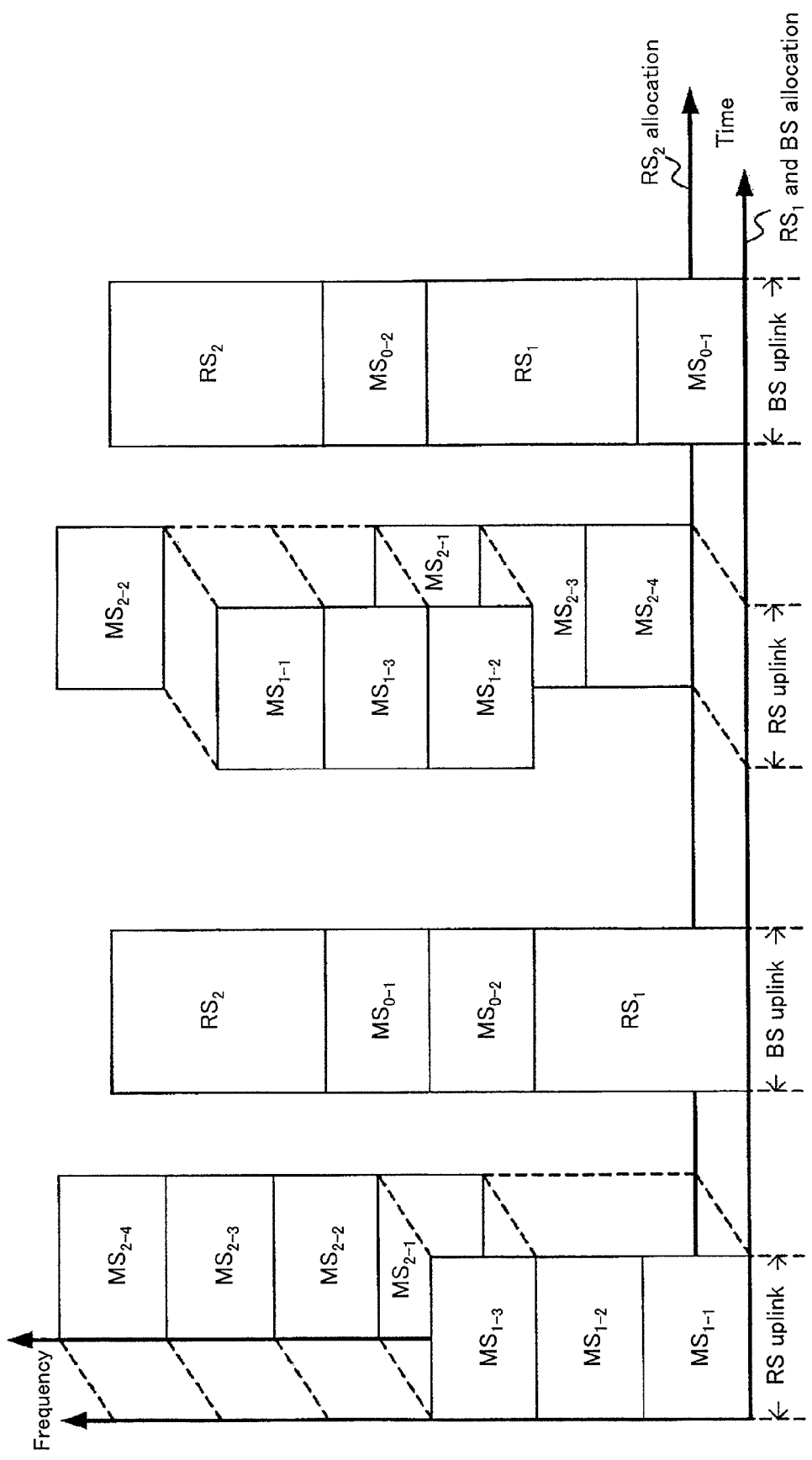
FIG. 8 is a diagram showing an example of the result of allocation, by the base station apparatus, of resource blocks on an uplink to be used for the CQI transmission.

FIG. 8 is a diagram showing an example of the result of allocation, by the base station apparatus, of resource blocks on an uplink to be used for the CQI transmission. In the graph of FIG. 8, the horizontal axis indicates the time and the vertical axis indicates the frequency. A resource block is represented by a square divided on the basis of the frequency and time, and the inside of the square indicates a relay station apparatus or a mobile station apparatus that is allocated. Although two graphs are displayed in an overlapped manner for descriptive purposes, i.e., to concurrently display the two relay station apparatuses and RS uplinks corresponding to the $RS_1$ and $RS_2$, such graphs represent resources with the same frequency and the same time.

As shown in FIG. 8, for communication directed to a relay station apparatus from mobile station apparatuses on the RS uplink, the same resource blocks can be allocated in an overlapped manner for different relay station apparatuses (e.g., the $MS_{1-3}$ and $MS_{2-1}$ on the leftmost RS uplink, and the $MS_{1-2}$ and $MS_{2-1}$ on the RS uplink on the right side) as long as such relay station apparatuses are located away from each other to an extent that they will not interfere with each other.

FIG. 8 shows an example in which two resource blocks are allocated to each of the $RS_1$ and $RS_2$ on the BS uplink. In this case, the $RS_1$ should relay-transmit the QCI from three mobile station apparatuses: $MS_{1-1}$, $MS_{1-2}$, and $MS_{1-3}$ using the two resource blocks. Thus, a modulation scheme or a code rate that achieves a transmission rate 1.5 times or more higher than that on the RS uplink is used on the BS uplink, compression or reduction (reduction in the quantization bit rate, reduction in the number of frequency channels to be informed, or the like) is performed to reduce the amount of the CQI information to ⅔ or less, or adjustment is carried out so that relay transmission can be performed with the two resource blocks by using both an increase in the transmission rate and a reduction in the amount of the CQI information.

Likewise, the $RS_2$ should also relay-transmit the CQI from four mobile station apparatuses: $MS_{2-1}$, $MS_{2-2}$, $MS_{2-3}$, and $MS_{2-4}$ using the two resource blocks. Thus, a modulation scheme or a code rate that achieves a transmission rate twice or more higher is used, compression or reduction is performed to reduce the amount of the CQI information to ½ or less, or adjustment is carried out so that the relay transmission can be performed with the two resource blocks by using both an increase in the transmission rate and a reduction in the amount of the CQI information.

Typically, a relay station apparatus can use relatively high transmission power than a mobile station apparatus can, and is often disposed at a location in which the propagation channel state with the base station apparatus is good. Thus, on the BS uplink from the relay station apparatus, it is possible to use a modulation scheme or a code rate that achieves higher transmission efficiency than that on the RS uplink. Alternatively, a transmission scheme such as MIMO can be used.

It should be noted that the mobile station apparatuses ($MS_{0-1}$ and $MS_{0-2}$), which report CQI directly to the base station apparatus, can be allocated in the same time slot as the relay station apparatuses as shown in FIG. 8. Alternatively, the BS uplink (for the mobile station apparatuses) can be allocated in the same time slot as the RS uplink in FIG. 8.

As described above, according to this embodiment, the base station apparatus can determine, on the basis of the information about whether each mobile station apparatus should communicate with the base station apparatus directly or via the relay station apparatus, and in the latter case, information about which relay station apparatus should relay the communication, allocation of resource blocks on an uplink to be used for the relay station apparatus to relay-transmit the CQI to the base station apparatus as well as allocation of resource blocks on an uplink to be used for each mobile station apparatus to report the CQI to the base station apparatus or to the relay station apparatus.

In addition, for each mobile station apparatus that reports CQI via a relay station apparatus, allocation of resource blocks on an uplink to be used for the mobile station apparatus to report the CQI to the relay station apparatus, the type of the CQI, and the like are determined on the basis of the allocation result of the resource blocks on the uplink for each relay station apparatus to relay-transmit the CQI to the base station apparatus. Accordingly, it is possible to allocate to mobile station apparatuses, which report CQI via different relay station apparatuses, the same resource block on the uplink for reporting CQI to the relay station apparatuses in an overlapped manner while also minimizing the number of overlaps, so that effective use of the uplink resources as well as minimization of interference is possible.

Further, for the relay transmission of CQI from relay station apparatuses to the base station apparatus, using a modulation scheme or a code rate that can realize high transmission efficiency allows a reduction in the overhead of the CQI relay transmission.

Although the aforementioned embodiment illustrates a case in which the base station apparatus communicates directly with all of the mobile station apparatuses in the downlink communication, the present invention can also be applied to a system in which downlink communication is performed via a relay station apparatus. In the case of an Amplify-and-Forward type system in which a relay station apparatus relay-transmits a downlink transmission signal from a base station apparatus only after amplifying the signal, a mobile station apparatus preferably reports CQI, which indicates the reception state based on the propagation channel state from the base station apparatus to the relay station apparatus, signal amplification at the relay station apparatus, and the propagation channel state from the relay station apparatus to the mobile station apparatus.

In the case of a Decode-and-Forward type system in which a relay station apparatus relay-transmits a downlink transmission signal from a base station apparatus after demodulating and decoding the signal, and further coding and modulating the signal, a mobile station apparatus preferably reports CQI, which indicates the reception state based at least on the propagation channel state from the relay station apparatus to the mobile station apparatus.

The aforementioned embodiment illustrates a case in which CNR is used as the CQI. However, it is also possible to use any of the following indexes: an index that indicates the reception state in relation to the received signal power or carrier power such as RSSI (Received Signal Strength Indicator), SNR, SIR (Signal to Interference power Ratio), SINR (Signal to Interference plus Noise power Ratio), CIR (Carrier to Interference power Ratio), or CINR (Carrier to Interference plus Noise power Ratio), or an index related to the transmission rate such as a modulation parameter selected in accordance with the propagation channel state, for example, a modulation parameter such as MCS (Modulation and Coding Scheme), which is a combination of a modulation scheme and a channel code rate, or the transmission rate.

The present invention can be applied to a communication system in which a mobile station apparatus measures the reception state from a received signal and reports the measurement result to a base station apparatus directly or via a relay station apparatus.

The invention claimed is:

1. A base station apparatus for use in a communication system that includes a base station apparatus and mobile station apparatuses configured to perform radio communication via a plurality of channels, and relay station apparatuses configured to relay the communication between the base station apparatus and the mobile station apparatuses, the base station apparatus comprising:
   a relay station allocation unit configured to determine a relay station allocation that is a channel allocation of first radio resources to be used for each relay station apparatus to relay-transmit to the base station apparatus reception state information indicating a channel reception state transmitted from each mobile station apparatus that communicates with the base station apparatus via the relay station apparatus, and determine a modulation scheme, a code rate or a number of MIMO streams to be used on the first radio resources for each relay station apparatus to transmit the reception state information to the base station apparatus on the basis of a propagation channel state between each relay station apparatus and the base station apparatus or the number of the mobile station apparatuses that are relayed by each relay station apparatus;
   a mobile station allocation unit configured to determine a mobile station allocation and a type of the reception state information, the mobile station allocation being a channel allocation of second radio resources to be used for each mobile station apparatus to transmit the reception state information to the relay station apparatus within a capacity of the first radio resources allocated to each relay station apparatus; and
   a radio transmission unit configured to transmit information to each mobile station apparatus and each relay station apparatus, the information including mobile station allocation information that indicates a result of the mobile station allocation, and relay station allocation information that indicates a result of the relay station allocation.

2. A relay station apparatus for use in a communication system that includes a base station apparatus and mobile station apparatuses configured to perform radio communication via a plurality of channels, and relay station apparatuses configured to relay the communication between the base station apparatus and the mobile station apparatuses, the relay station apparatus comprising:
   a first radio reception unit configured to receive information transmitted from the base station apparatus, the information including mobile station allocation information and relay station allocation information, the mobile station allocation information indicating a channel allocation of second radio resources to be used for each mobile station apparatus, which communicates with the base station apparatus via the relay station apparatus, to transmit to the relay station apparatus reception state information indicating a channel reception state, and the relay station allocation information indicating a channel allocation of first radio resources to be used for the relay station apparatus to relay-transmit to the base station apparatus the reception state information transmitted from each mobile station apparatus;
   an allocation information storage unit adapted to have stored therein the mobile station allocation information and the relay station allocation information that have been received;
   a second radio reception unit configured to receive, on the basis of the mobile station allocation information stored in the allocation information storage unit, the reception state information transmitted from each mobile station apparatus that communicates with the base station apparatus via the relay station apparatus among the mobile station apparatuses;
a reconstruction unit configured to reconstruct, on the basis of the relay station allocation information stored in the allocation information storage unit, each of the received reception state information; and
a radio transmission unit configured to transmit, on the basis of the relay station allocation information stored in the allocation information storage unit, each of the reconstructed reception state information to the base station apparatus.

3. The relay station apparatus according to claim 2, wherein the reconstruction unit couples each of the received reception state information together.

4. The relay station apparatus according to claim 2, wherein the reconstruction unit reconstructs each of the received reception state information by reducing a quantization bit rate of each of the received reception state information.

5. The relay station apparatus according to claim 2, wherein the reconstruction unit reconstructs each of the received reception state information by selecting reception states related to some of channels from among reception states related to a plurality of channels included in each of the received reception state information.

6. A communication system comprising a base station apparatus and mobile station apparatuses configured to perform radio communication via a plurality of channels, and relay station apparatuses configured to relay the communication between the base station apparatus and the mobile station apparatuses, wherein
the base station apparatus performs the following processes:
determining a relay station allocation that is a channel allocation of first radio resources to be used for each relay station apparatus to relay-transmit to the base station apparatus reception state information indicating a channel reception state transmitted from each mobile station apparatus that communicates with the base station apparatus via the relay station apparatus,
determining a modulation scheme, a code rate or a number of MIMO streams to be used on the first radio resources for each relay station apparatus to transmit the reception state information to the base station apparatus on the basis of a propagation channel state between each relay station apparatus and the base station apparatus or the number of the mobile station apparatuses that are relayed by each relay station apparatus, and
determining a mobile station allocation and a type of the reception state information, the mobile station allocation being a channel allocation of second radio resources to be used for each mobile station apparatus to transmit the reception state information to the relay station apparatus on the basis of a result of the relay station allocation.

7. A base station apparatus for use in a communication system that includes a base station apparatus and mobile station apparatuses configured to perform radio communication via a plurality of channels, and relay station apparatuses configured to relay the communication between the base station apparatus and the mobile station apparatuses, the base station apparatus comprising:
a relay station allocation unit configured to determine a relay station allocation that is a channel allocation of first radio resources to be used for each relay station apparatus to relay-transmit to the base station apparatus reception state information indicating a channel reception state transmitted from each mobile station apparatus that communicates with the base station apparatus via the relay station apparatus;
a mobile station allocation unit configured to determine a mobile station allocation and a type of the reception state information, the mobile station allocation being a channel allocation of second radio resources to be used for each mobile station apparatus to transmit the reception state information to the relay station apparatus within a capacity of the first radio resources allocated to each relay station apparatus, and determine, on the basis of information on the determined relay station allocation, a number of channels to be selected, being this number a type of the reception state information, which will be reported by each mobile station apparatus, an information compression ratio, being this ratio a type of the reception state information, which will be reported by each mobile station apparatus, or the number of bits that represent the reception state information, being this number a type of the reception state information, which will be reported by each mobile station apparatus; and
a radio transmission unit configured to transmit information to each mobile station apparatus and each relay station apparatus, the information including mobile station allocation information that indicates a result of the mobile station allocation, and relay station allocation information that indicates a result of the relay station allocation.

* * * * *